J. W. McMILLAN.
Combined Chopper and Cultivator.
No. 211,760. Patented Jan. 28, 1879.
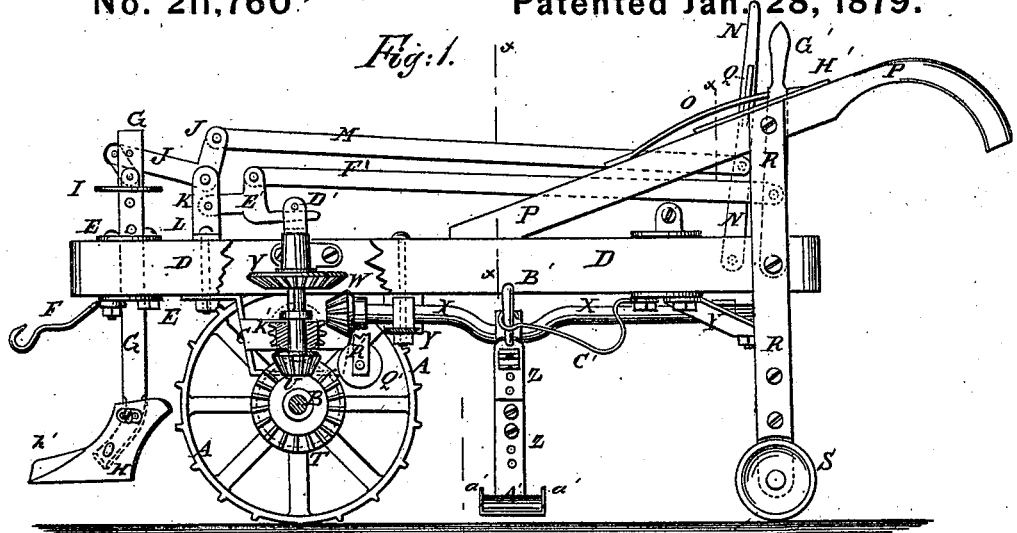
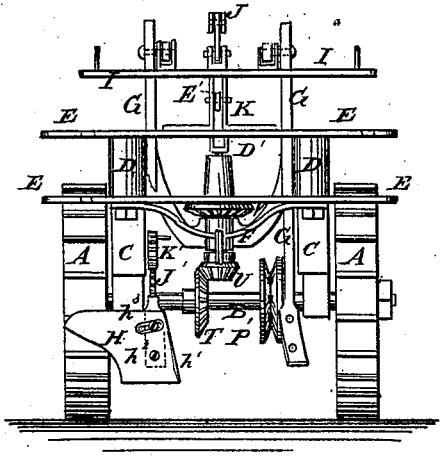
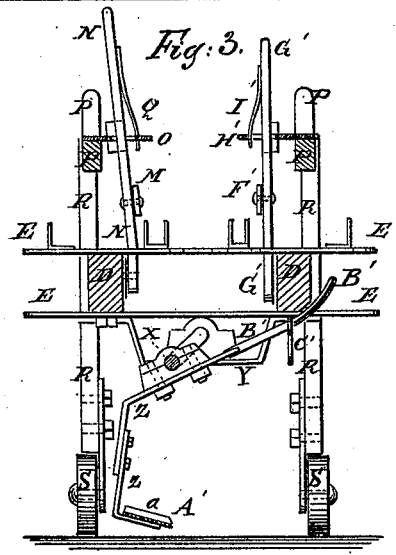
WITNESSES:
INVENTOR:
J. W. McMillan
BY Munn & Co
ATTORNEYS.

UNITED STATES PATENT OFFICE.

JOHN W. McMILLAN, OF BROOKHAVEN, MISSISSIPPI.

IMPROVEMENT IN COMBINED CHOPPER AND CULTIVATOR.

Specification forming part of Letters Patent No. 211,760, dated January 28, 1879; application filed May 29, 1878.

*To all whom it may concern:*

Be it known that I, JOHN WILLIAM MC-MILLAN, of Brookhaven, in the county of Lincoln and State of Mississippi, have invented a new and useful Improvement in Combined Chopper and Cultivator, of which the following is a specification:

Figure 1 is a side view of my improved machine, part being broken away to show the construction. Fig. 2 is a front view of the same, part being broken away to show the construction. Fig. 3 is a cross-section of the same, taken through the broken line $x\,x\,x\,x$, Fig. 1.

Similar letters of reference indicate corresponding parts.

The invention will first be described in connection with the drawings, and then pointed out in the claim.

A are the wheels, which are made with wide corrugated rims, to prevent them from sinking into the soil. One of the wheels A revolves loosely upon, and the other is rigidly attached to, the axle B, so as to carry the said axle with it in its revolution. The axle B revolves in brackets C, attached to the lower sides of the side bars D.

To the upper and lower sides of the side bars D, near their ends, are attached cross-bars or plates E, which have holes formed in them to receive the plow-standards. The upper rear plate is provided with lugs upon its upper side, to receive the bolts by which the said plow-standards are secured to it. Several sets of holes are formed through the bars or plows E to receive the plow-standards, so that they may be adjusted as the purpose for which they are to be used may require.

To the forward end of the bars D is attached the branched shank of the hook F, to which the draft is applied.

G are the forward plow-standards, which pass up through holes in the forward plates E, and have holes in their lower parts to receive the bolts by which the scrapers H are secured to them. The scrapers H have flanges $h^1$ formed upon the lower part of their inner-side edges, as shown in Figs. 1 and 2, to divide the soil and prevent the small plants from being moved out of place, or having the soil around them broken away by the action of the scrapers in barring off. The scrapers H are secured to the standards G by two bolts, as shown in Figs. 1 and 2, the lower bolt passing through a hole, $h^2$, in the lower part of the said scrapers, and the upper bolt passing through a slot, $h^3$, in the upper part of the said scrapers, to enable the said scrapers to be adjusted with their lower edges horizontal or inclined, as may be desired.

The upper parts of the standards G pass through holes in a plate or bar, I, placed above the upper forward bar or plate E, and are secured to said plate I by bolts passing through said standards and through lugs formed upon the upper side of the said plate I.

Several holes are formed through the standard G to receive the fastening-bolts, so that the said standards may be adjusted to cause the scrapers H to work deeper or shallower in the ground, as may be desired.

To the center of the plate I is attached a stud, to which is pivoted, by a link or short connecting-bar, the end of a bent lever, J. The lever J is pivoted at its angle to a stud, K, attached to a bar, L. The ends of the bar L are attached to the side bars D, a little in the rear of the forward plates or bars E, as shown in Fig. 1.

To the end of the short arm of the lever J is pivoted a connecting rod or bar, M, the rear end of which is pivoted to a lever, N. The lower end of the lever N is pivoted to the inner rear part of one of the side bars D; and its upper end passes up through a slot in the plate O, attached to one of the handles P. In the plate O, along the side of its slot, are formed notches to receive a catch formed upon or attached to the lever N, to hold the said lever in any position into which it may be adjusted.

The lever N is pressed against the notched edge of the plate O by a small spring, Q, attached to it, and which rests against the edge of the plate O at the other side of its slot. With this construction, by operating the lever O, the scrapers H can be raised and lowered, as may be desired by the plowman, without leaving the handles P. The forward end of the handles P are bolted to the upper sides of the middle parts of the side bars D, and their rear parts are bolted to the upper ends of the standards R. The standards R are bolted to the rear ends of the side bars D, and to their lower ends are bolted the standards of the small wheels S, by which the rear part of the machine is supported.

To the axle B is rigidly attached a beveled gear-wheel, T, into the teeth of which mesh the teeth of a small beveled gear-wheel, U. The journal of the gear-wheel V revolves in bearings in the bracket attached to the side bars D, and upon its upper part is placed a beveled gear-wheel, V. The gear-wheel V is connected with its journal by a tongue and groove, so that it may be slid up and down upon the said journal while being carried about by and with the journal in its revolution.

The teeth of the gear-wheel V mesh into the teeth of a small beveled gear-wheel, W, attached to the end of the shaft X, which revolves in bearings in brackets Y, attached to the side bars D. Upon the middle part of the shaft is X is formed a crank, to which is pivoted a standard, Z.

To the lower end of the standard Z is attached a chopping-plate or hoe, A', upon the side edges of which are formed sharp upwardly-projecting flanges a', to prevent the said hoe from breaking the soil about the plants adjacent to its side edges, and to enable it to cut off roots, &c., to prevent the said plants from being pulled out of place by said hoe. The standard Z is made in two parts, the adjacent ends of which overlap each other, and are secured together by two bolts, so that the length of said standard may be readily adjusted as may be required.

To the upper part of the standard Z is attached, or upon it is formed, a lever, B', which passes through an eye or guide-hole in the end of the spring C', attached to the side bar D.

By this construction, as the shaft X is revolved the chopper Z A' will be operated, in a manner very similar to the movements of a hoe in hand chopping, to chop the plants to a stand; and should the said chopper strike an obstruction, the spring C' will allow it to yield without being broken.

To the upper end of the hub of the gear-wheel V is swiveled a stud, D', to which is pivoted an arm of the three-armed lever E'. The forward arm of the lever E' is pivoted to the stud K, and to the upper arm of the said lever is pivoted the end of a connecting-bar, F'. The rear end of the connecting-bar F' is pivoted to a lever, G', the lower end of which is pivoted to the rear part of one of the side bars D. The upper part of the lever G' passes through a slotted plate, H', attached to the handle P. In the edge of the plate H', along one side of its slot, are formed notches to receive a catch formed upon or attached to the lever G', to hold the said lever securely in any position into which it may be adjusted.

The lever G' is held against the notched edge of the plate H' by a spring, I', attached to it, and which rests against the edge of the said plate H' at the other side of its slot, as shown in Fig. 3.

With this construction, by operating the lever G' the gear-wheel V may be raised and lowered upon its journal to throw it out of and into gear with the gear-wheel W, so that the chopper may be thrown out of gear and prevented from operating whenever desired. This is especially convenient when places in the row of plants are reached where the plants are so scattering that it is not desirable that any of them shall be chopped out. The lever G' may be operated by the plowman to throw the chopper into and out of gear without leaving the handles P of the machine.

Having thus described my invention, I claim as new and desire to secure by Letters Patent—

The combination of the four bevel-gear wheels T U V W, the three-armed lever E', the connecting-bar T', and the lever G' with the wheels and axle A B and the crank-shaft X, that carries and operates the choppers Z A', substantially as herein shown and described.

JOHN WILLIAM McMILLAN.

Witnesses:
EDWARD JACOB SCHULLER,
SAMUEL GOODWIN.